United States Patent Office 3,420,843
Patented Jan. 7, 1969

3,420,843
NOVEL 1,2-PHTHALYLCARBAZOLE
PIGMENT DYESTUFFS
Erich Dietz, Kelkheim, Taunus, Otto Fuchs and Erich Schinzel, Frankfurt am Main, and Dieter Wagner, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Aug. 6, 1963, Ser. No. 300,181
Claims priority, application Germany, Aug. 7, 1962,
F 37,544
The portion of the term of the patent subsequent to
Aug. 8, 1984, has been disclaimed
U.S. Cl. 260—316                                6 Claims
Int. Cl. C09b 1/32

The present invention relates to novel pigment dyestuffs which are very suitable for dyeing lacquers, plastic masses and printing pastes and to a process for preparing them; more particularly it relates to 1,2-phthalyl-carbazole pigment dyestuffs of the general formula

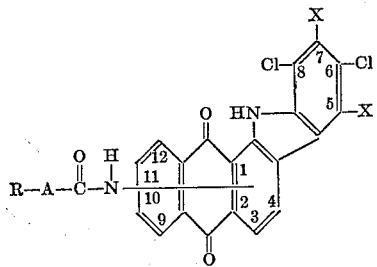

in which A represents an aromatic radical and X represents a hydrogen, chlorine or bromine atom or an alkyl radical, R represents a halogen atom or an alkyl radical or is identical with the 1,2-phthalyl-carbazole-aminocarbonyl radical linked to radical A, and in which the aroylamino group is linked in 3- or 9-position.

It is known that α-arylamino-anthraquinones can be converted into 1,2-phthalyl-carbazoles by treating the former with acid condensing agents and that under these circumstances the carbazole cyclization takes place with a satisfactory yield only if an aroylamino group occupies one of the remaining α-positions of the anthraquinone nucleus. After the treatment with the condensing agents an oxidation is generally required which may be carried out in an alkaline medium wtih hypochlorite or in an acid medium with bichromate or nitrite.

The carbazole condensation does not take a uniform course, in general. German patent specification 288,824 discloses a process for preparing 1,2-phthalyl-carbazoles in which α-arylamino-α'-aroylamino-anthraquinones are treated first with concentrated sulfuric acid and then with oxidizing agents. In this case, the p-position to the secondary amino group in the arylamino radical must be occupied since otherwise diphenyl derivatives would be formed during the subsequent oxidation. The concentrated sulfuric acid always causes a partial splitting off of the aroyl group with the formation of compounds having a free amino group which are incapable of reacting and remain in the reaction mixture as by-products. Moreover, the reaction product can be sulfurized by the concentrated sulfuric acid.

German patent specification 746,546 discloses a process for preparing vat dyestuffs of the anthraquinone series in which molecular compounds of aluminium halides and sulfur dioxide are caused to act upon compounds having aromatically substituted secondary amino groups, one of the aromatic groups representing an acylamino-anthraquinone radical. However, when reacting 1-benzoylamino-4-(2',5'-dichlorophenylamino)-anthraquinone in a melt of the molecular compound of aluminium chloride and sulfur dioxide to form the 1,2-phthalyl-carbazole derivative, sulfurous by-products are formed, showing that a reaction has taken place between the sulfur dioxide and the starting compound or the final product.

The 1,2-phthalyl-carbazoles prepared by known processes are vat-dyestuffs which to a certain extent possess remarkable fastness properties. They can, however, not be remarkable fastness properties. They cannot, however, be used as pigment dyestuffs, since owing to their insufficient purity they do not possess the properties necessary in practice, such as softness of grain, fastness to solvents, fastness to bleeding in plasticized polyvinyl chloride and fastness to light.

It has now been found that 1,2-phthalyl-carbazole pigment dyestuffs which are very suitable for dyeing lacquers, plastic masses and printing pastes and have the general formula

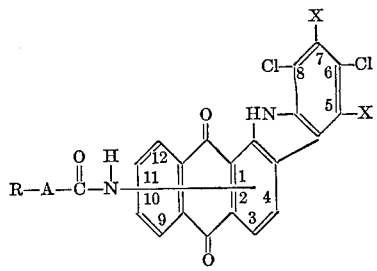

in which A represents an aromatic radical and X represents a hydrogen, chlorine or bromine atom or an alkyl radical, R represents a halogen atom or an alkyl radical or is identical with the 1,2-phthalyl-carbazole-aminocarbonyl radical linked to radical A, and in which the aroylamino group is linked in 3- or 9-position, are obtained by treating α-phenylamino-α'-aroylamino-anthraquinones of the general formula

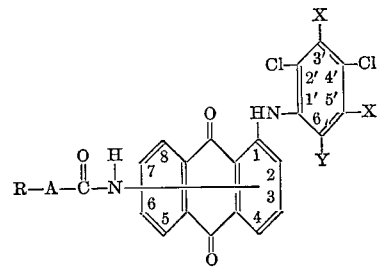

in which R, A and X are defined as above, Y represents a hydrogen or halogen atom and the aroylamino group is bound in 4- or 5-position of the anthraquinone nucleus, with acid condensing agents.

The process is advantageously carried out by reacting α-phenylamino-α'-aroylamino-anthraquinones of the above formula, in which Y represents a hydrogen atom, in a melt of an acid condensing agent as, for example, in the melt of the molecular compound of aluminium chloride and sulfur dioxide, at temperatures ranging between about 50° and 100° C., hydrolyzing it with water and subsequently oxidizing it with sodium hypochlorite and potassium permanganate in a strongly alkaline suspension. If in the phenyl radical both o-positions to the secondary amino group are occupied by halogen, reaction temperatures of between about 150° and 180° C. are required for the cyclization reaction. The optimum temperature to be used in each individual case has to be adapted to the reaction components used. The reaction takes place particularly smoothly, when carried out in an aluminum chloride melt liquefied with sulfur dioxide. As fluxing agent there may also be used sodium sulfite, sodium hydrogen sulfite or sodium chloride.

The α-polyhalogen-phenylamino-α'-aroylamino-anthraquinones used for the condensation can be prepared, for example, according to the process disclosed in Swiss patent specification 232,514 by reacting α-halogen-α'-aroylamino-anthraquinones with correspondingly substituted anilines or by reacting α-amino-α'-aroylamino-anthraquinones with polyhalogen-benzenes. Furthermore, the starting compounds can be prepared by halogenation of α-phenylamino-α'-aroylamino-anthraquinones.

It has been found that the phenyl radical of the α-phenylamino-α'-aroylamino-anthraquinone must be substituted at least in 2'- and 4'-position to the secondary amino group by chlorine atoms, if 1,2-phthalyl-carbazole free from by-products is to be obtained with good yield in a smooth reaction. Higher halogenated compounds, such as the 2',4',5'-trichlorophenyl or the pentachlorophenyl derivative, are also very suitable for the reaction. The substitution of the phenyl nucleus in 4'-position as described in the above mentioned German patent specification 288,824 or in 2'-position (German patent specification 740,052) or in 2',5'-position (German patent specification 746,546) is insufficient. When subjecting the α-phenyl-α'-aroylamino-anthraquinones substituted in this known manner to the carbazole cyclization reaction, sulfurous products are always obtained which have to be purified with great losses.

The aroylamino radical may be bound in 4- or 5-position of the anthraquinone nucleus. As acid radicals are suitable those of aromatic mono- or dicarboxylic acids which may be substituted in the nucleus, for example, by halogen atoms or alkyl groups. The carbazole cyclization reaction fails, when α-phenylamino-anthraquinones substituted in 4- or 5-position by an aliphatic acylamino group are used.

The dyestuffs obtained are very suitable for dyeing lacquers, plastic masses and printing pastes. Especially the fastness to light of the dyeings is outstanding. The fastness to solvents of the dyestuffs, the fastness to bleeding of the plasticized polyvinyl chloride into which the dyestuff had been incorporated and the fastness to overspraying of the lacquers are excellent too. Since these properties largely depend upon the purity of the dyestuff, the dyestuffs obtainable by the process of the present invention in high purity are superior to those of similar constitution obtained in impure state according to the processes already known.

In the process of the present invention the dyestuffs are obtained directly in a soft grain so that grinding is not required. Minor impurities can be removed by boiling out with high-boiling point solvents.

The following examples serve to illustrate the invention, but they are not intended to limit it thereto, the parts being by weight unless otherwise stated and the relationship of parts by weight to parts by volume being the same as that of the kilogram to the liter.

EXAMPLE 1

600 parts of aluminium chloride and 100 parts of sodium chloride are mixed, then about 130 parts of sulfur dioxide are introduced and the mass is liquefied by heating to about 130° to 140° C. After the melt has cooled to 70° to 80° C., 100 parts of 1-(2',4',5'-trichloro-phenylamino)-5-(4''-chlorobenzoylamino)-anthraquinone of the formula

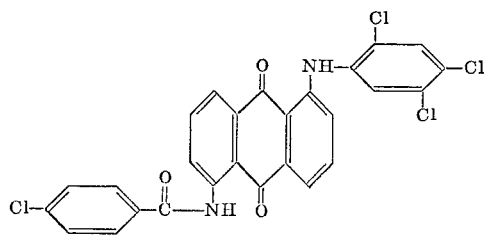

are introduced within 30 minutes. A gentle SO₂-stream is conducted over the melt and stirring is continued for 3 hours at 70° to 80° C. The reaction mixture is then poured into water, rendered acid to congo paper with hydrochloric acid, boiled up, filtered off and washed until neutral.

The moist press cake is suspended in a mixture of 800 parts of sodium hypochlorite solution (about 14% of NaOCl), 450 parts of sodium hydroxide solution of 33% strength, 30 parts of nitrobenzene and 70 parts of potassium permanganate and the mixture is stirred at 65° to 70° C. If necessary, further hypochlorite solution and potassium permanganate are added, until they are not consumed any more and are detectable in excess. After the oxidation, which is accomplished after about 10 to 20 hours, the whole is diluted with water, filtered and washed until neutral. The press cake is then suspended in 2000 parts by volume of sodium hydrogen sulfite solution, then 250 parts by volume of concentrated hydrochloric acid are added, the whole is boiled up, filtered and washed until neutral. The dyestuff is obtained in the form of a brilliant orange powder having a soft grain with a yield of 87.5 parts which corresponds to a yield of 88% of the theory. The dyestuff has the formula

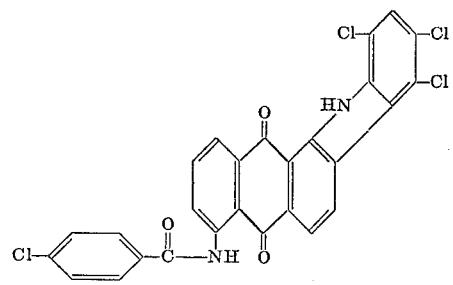

The properties of fastness to solvents suffice in practice. They can be improved by heating to the boil the product which had been well dried by suction-filtering, in 1200 parts of 1,2,4-trichlorobenzene, cooling to 150° C., filtering off at this temperature and washing with hot trichlorobenzene. Under these circumstances the dyestuff is transformed into microscopic needles melting at temperatures above 400° C. The shade and the softness of grain are unchanged. When incorporated in lacquers and plastic masses the dyestuff possesses an extremely good fastness to light.

The 1-(2',4',5'-trichlorophenylamino) - 5 - (4''-chlorobenzoylamino)-anthraquinone required as starting compound for the reaction can be prepared in the following manner: a mixture of 376 parts of 1-amino-5-(4'-chlorobenzoylamino)-anthraquinone, 66 parts of anhydrous sodium carbonate, 10 parts of copper acetate, 870 parts of 1,2,4,5-tetrachlorobenzene and 500 parts of nitrobenzene is heated at 190° to 200° C. for 20 hours. When the reaction is complete, the hot melt is introduced into 5000 parts by volume of carbon tetrachloride, the whole is heated to the boil, then stirred for 1 hour at boiling temperature and filtered at 60° C. The substance that had been filtered off is washed with hot carbon tetrachloride and alcohol and boiled out with dilute hydrochloride acid for removing the inorganic salts. The 1-(2',4',5'-trichlorophenylamino) - 5 - (4''-chlorobenzoylamino)-anthraquinone is obtained in a red crystal powder melting at 304° to 305° C. The yield is 530 parts (95% of the theory).

The 1-(2',4',5'-trichlorophenylamino) - 5 - (4''-chlorobenzoylamino)-anthraquinone can also be prepared by reacting 1 - amino-5-(4'-chlorobenzoylamino)-anthraquinone with 1,2,4-trichlorobenzene and then chlorinating the product obtained with sufonyl chloride in trichlorobenzene.

(prepared from 4,4' - diphenyl - dicarboxylic acid-N,N'-di-4''-amino-1'''-anthraquinonyl)-amide and 1,2,4,5-tetrachlorobenzene) are carbazolized at 70° to 80° C. according to the process described in Example 1 in a melt of aluminum chloride and sulfur dioxide. After the oxidation 82 parts of a bluish-red pigment dyestuff possessing excellent fastness properties are obtained. The dyestuff obtained has the formula

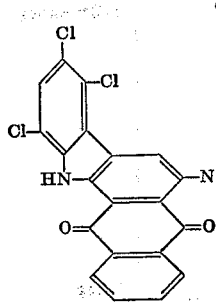
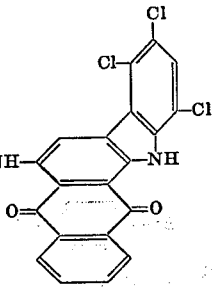

EXAMPLE 2

100 parts of 1-(2',4' - dichlorophenylamino) - 5 - (4''-methylbenzoylamino)-anthraquinone of the formula

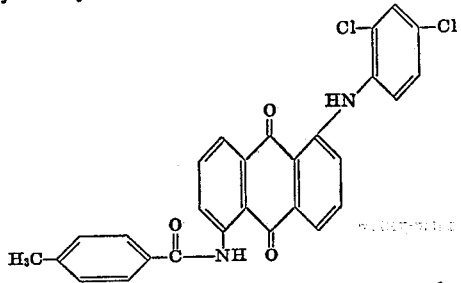

(prepared from 1 - chloro - 5 - (4'-methylbenzoylamino)-anthraquinone and 2,4-dichloraniline according to the process of Swiss patent specification 232,514) are carbazolized according to the process described in Example 1 in a melt of aluminum chloride and sulfur dioxide. 80 parts of a clear reddish-yellow pigment dystuff are obtained which crystallizes in the form of needles when boiled up in trichlorobenzene and melts at 360° to 362° C. under decomposition. The fastness properties are very good. The dyestuff has the following formula

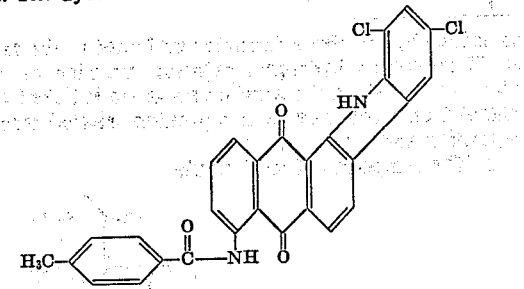

A reddish-yellow pigment dyestuff possessing similar fastness properties is obtained by carbazolizing according to the above-described process 1-(2',4'-dichloro-5'-methylphenyl-amino) - 5 - (4''-bromobenzoylamino)-anthraquinone.

EXAMPLE 3

100 parts of a compound of the formula

EXAMPLE 4

600 parts of aluminum chloride are mixed with 100 parts of sodium chloride and the mixture is liquefied by heating to 180° C. The melt is cooled to 150° C. and 100 parts of a compound of the formula

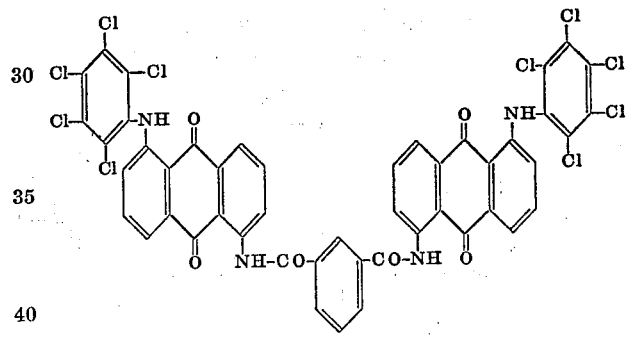

(obtained from isophthalic acid - N,N' - di - (5'-amino-1'-anthraquinonyl)-amide and hexachlorobenzene) are introduced. The reaction mixture is stirred for 90 minutes at 170° to 180° C., then mixed with water and oxidized and worked up according to the process described in Example 1. There are obtained 85 parts of a clear yellow pigment of the formula

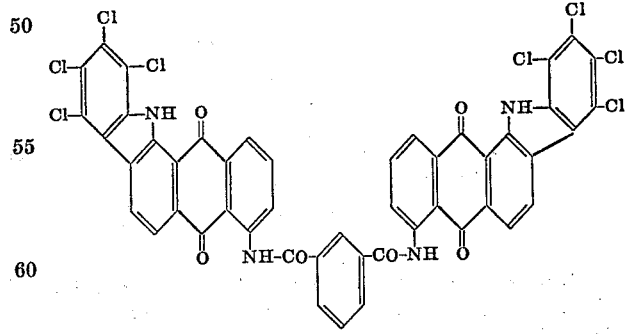

The dyestuff possesses excellent fastness properties.

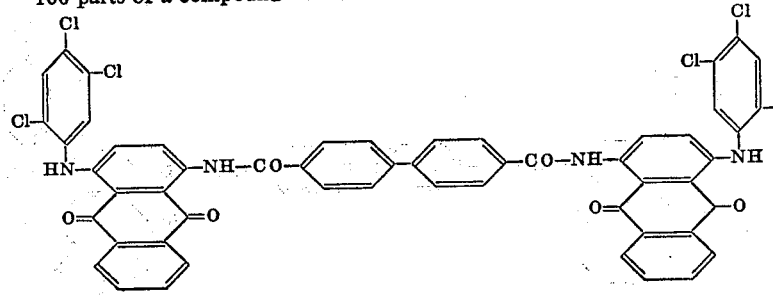
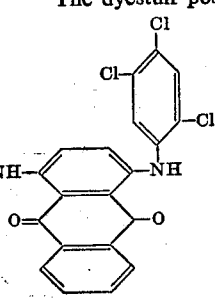

The following table contains further dyestuffs which are obtained according to the process described in the above examples.

| Dyestuff of the formula | Tint |
|---|---|
| (1) 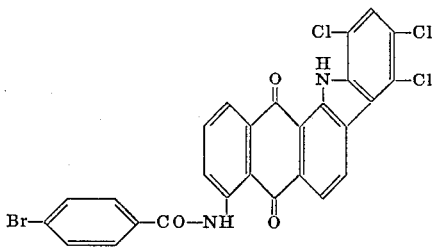 | Yellow-orange. |
| (2) 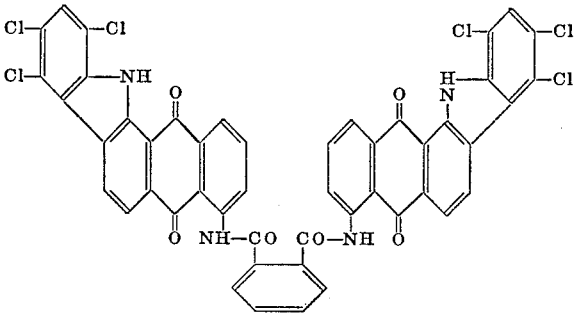 | Orange. |
| (3) 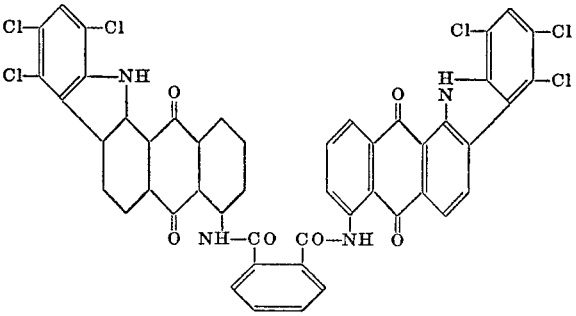 | Reddish-yellow. |

We claim:
1. The compound of the formula

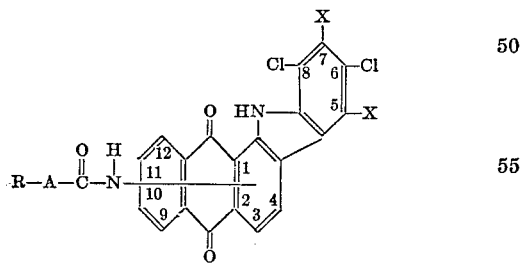

in which A represents a member of the group consisting of phenylene, diphenylene and pyridine, R represents a member of the group consisting of chlorine, a bromine, a lower alkyl and 1,2-phthalyl-carbazole-aminocarbonyl as defined by the above formula and linked to the radical A, X represents hydrogen, chlorine, bromine or lower alkyl, and in which the aroylamino group is linked to the phthalyl-carbazole radical in a position selected from the 3-position and the 9-position.

2. The compound of the formula

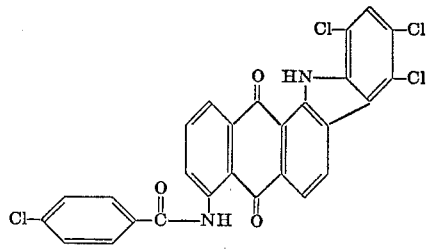

3. The compound of the formula

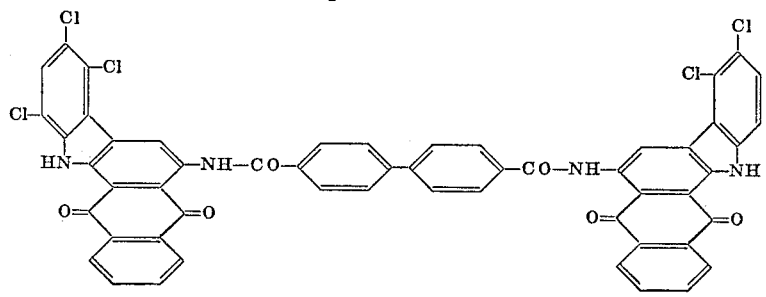

4. The compound of the formula
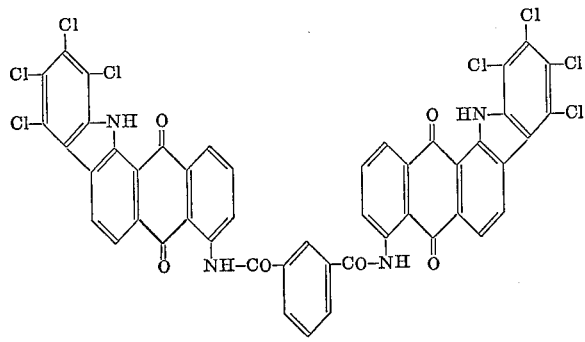
5. The compound of the formula
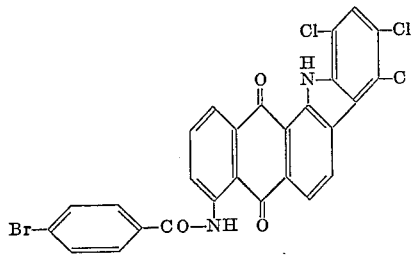
6. The compound of the formula
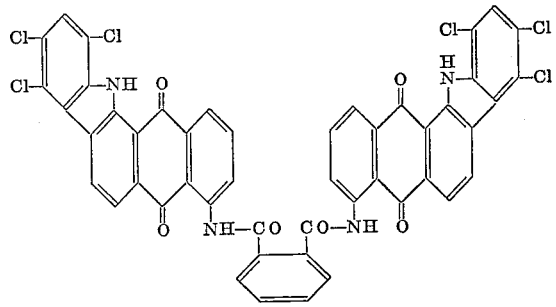
References Cited
FOREIGN PATENTS
228,135  11/1943  Switzerland.
OTHER REFERENCES
Venkataraman: "Chemistry of Synthetic Dyes," vol. 1, pp. 64–69, 120–124 (Academic Press) (1952).
Venkataraman: "Chemistry of Synthetic Dyes," vol. 2, pp. 899–910 (Academic Press (1952).
HENRY R. JILES, *Primary Examiner.*
R. T. BOND, *Assistant Examiner.*
U.S. Cl. X.R.
8—4, 6, 70; 260—295